United States Patent
Matsuo et al.

(10) Patent No.: US 7,159,418 B2
(45) Date of Patent: Jan. 9, 2007

(54) METHOD OF PRODUCING SYNTHETIC QUARTZ GLASS

(75) Inventors: Koji Matsuo, Kubiki-mura (JP); Hisatoshi Otsuka, Kubiki-mura (JP); Kazuo Shirota, Kubiki-mura (JP); Shigeru Maida, Kubiki-mura (JP)

(73) Assignee: Shin-Etsu Chemical Co, Ltd., Tokyo (JP)

( * ) Notice: Subject to any disclaimer, the term of this patent is extended or adjusted under 35 U.S.C. 154(b) by 353 days.

(21) Appl. No.: 09/930,693

(22) Filed: Aug. 17, 2001

(65) Prior Publication Data

US 2002/0038557 A1 Apr. 4, 2002

(30) Foreign Application Priority Data

Aug. 18, 2000 (JP) ............... 2000-248556

(51) Int. Cl.
*C03B 19/14* (2006.01)
*C03C 3/06* (2006.01)

(52) U.S. Cl. .................... 65/17.4; 65/17.6

(58) Field of Classification Search ........ 65/397, 65/377, 414–417, 378, 427, 435, DIG. 16, 65/17.4, 17.1, 387, 17.6
See application file for complete search history.

(56) References Cited

U.S. PATENT DOCUMENTS

| | | | | |
|---|---|---|---|---|
| 4,225,330 A | * | 9/1980 | Kakuzen et al. | 65/426 |
| 4,345,928 A | * | 8/1982 | Kawachi et al. | 65/412 |
| 4,367,085 A | * | 1/1983 | Suto et al. | 65/415 |
| 4,428,762 A | * | 1/1984 | Andrejco et al. | 65/414 |
| 4,552,576 A | * | 11/1985 | Hara et al. | 65/378 |
| 4,586,943 A | * | 5/1986 | Kyoto et al. | 65/397 |
| 4,610,709 A | * | 9/1986 | Kawauchi et al. | 65/397 |
| 4,627,867 A | * | 12/1986 | Tanaka et al. | 65/421 |
| 4,650,511 A | * | 3/1987 | Koya et al. | 65/30.1 |
| 4,666,488 A | * | 5/1987 | Mizutani et al. | 65/421 |
| 4,676,814 A | | 6/1987 | Ross et al. | |
| 4,935,045 A | * | 6/1990 | Yamauchi et al. | 65/412 |
| 4,969,941 A | * | 11/1990 | Kyoto et al. | 65/391 |
| 5,203,898 A | * | 4/1993 | Carpenter et al. | 65/398 |

(Continued)

FOREIGN PATENT DOCUMENTS

EP 1 067 097 A1 1/2001

(Continued)

OTHER PUBLICATIONS

Machine translation of abstract from JP 04-074728 (Published Mar. 10, 1992) from http://www.ipdl.jpo.go.jp/homepg_e.ipdl retrieved on Mar. 13, 2003.*

(Continued)

*Primary Examiner*—Carlos Lopez
(74) *Attorney, Agent, or Firm*—Millen, White, Zelano & Branigan, P.C.

(57) ABSTRACT

Fluorine-containing synthetic quartz glass is produced by feeding silica-forming material, hydrogen, and oxygen gases from a burner to a reaction zone, flame hydrolyzing the silica-forming material in the reaction zone to form particles of silica, depositing the silica particles on a rotatable substrate in the reaction zone to form a porous silica matrix, and heating and vitrifying the porous silica matrix in a fluorine compound gas-containing atmosphere. During formation of the porous silica matrix, the angle between the center axes of the silica matrix and the silica-forming reactant flame from the burner is adjusted to 90–120° so that the porous silica matrix has a density of 0.1–1.0 g/cm³ with a narrow distribution within 0.1 g/cm³. The resulting quartz glass has a high transmittance to light in the vacuum ultraviolet region below 200 nm.

11 Claims, 2 Drawing Sheets

U.S. PATENT DOCUMENTS

| | | | | |
|---|---|---|---|---|
| 5,210,816 | A * | 5/1993 | Iino et al. | 385/142 |
| 5,326,729 | A * | 7/1994 | Yaba et al. | 501/54 |
| 5,474,588 | A * | 12/1995 | Tanaka et al. | 65/390 |
| 5,599,371 | A * | 2/1997 | Cain et al. | 65/413 |
| 5,788,730 | A * | 8/1998 | Ruppert et al. | 65/17.4 |
| 6,145,344 | A * | 11/2000 | Oyamada et al. | 65/414 |
| 6,263,706 | B1 * | 7/2001 | Deliso et al. | 65/397 |
| 6,319,634 | B1 * | 11/2001 | Berkey et al. | 430/5 |
| 6,333,284 | B1 * | 12/2001 | Otsuka et al. | 501/54 |
| 6,351,972 | B1 * | 3/2002 | Ohtsuka | 65/17.4 |
| 6,541,405 | B1 * | 4/2003 | Otsuka et al. | 501/54 |
| 6,653,024 | B1 * | 11/2003 | Shiraishi et al. | 430/5 |
| 2001/0017042 | A1 * | 8/2001 | Maida et al. | 65/17.4 |
| 2001/0018835 | A1 * | 9/2001 | Abe et al. | 65/17.4 |
| 2005/0109065 | A1 * | 5/2005 | Ichii et al. | 65/397 |

FOREIGN PATENT DOCUMENTS

| | | |
|---|---|---|
| EP | 1 127 857 A2 | 8/2001 |
| JP | 4-74728 | 3/1992 |
| JP | 05-330843 * | 12/1993 |
| JP | 11-11956 | 1/1999 |
| JP | 11-209128 | 8/1999 |
| WO | WO 00/48046 | 8/2000 |

OTHER PUBLICATIONS

Machine translation of JP 11-011956 (Published Jan. 19, 1999) from http://www.ipdl.jpo.go.jp/homepg_e.ipdl retrieved on Mar. 14, 2003.*

Machine translation of JP 11-209128 (Published Aug. 3, 1999 from http://www.ipdl.jpo.go.jp/homepg_e.ipdl retrieved on Mar. 14, 2003.*

European Search Report for EP 01 30 7043.

* cited by examiner

METHOD OF PRODUCING SYNTHETIC QUARTZ GLASS

BACKGROUND OF THE INVENTION

1. Field of the Invention

The present invention relates to synthetic quartz glass for optics having a uniform transmittance and refractive index to radiation in the vacuum ultraviolet region from ArF and $F_2$ excimer lasers. The invention relates also to a process for producing such synthetic quartz glass and a synthetic quartz glass substrate for use as photomasks.

2. Prior Art

Lithography systems plays the main role in the LSI manufacturing process, and one typical material used therein is quartz glass of high purity having high UV transmittance. Synthetic quartz glass is employed in lithography systems as stepper lens and photomask or reticle substrates which are used in the exposure and transfer steps of circuit patterns to silicon wafers.

The stepper apparatus generally includes an illumination section, a projection lens section and a wafer drive section. The illumination section converts light emitted by a light source into light of uniform intensity and guides it onto a photomask. The projection lens section plays the role of focusing the circuit pattern of the photomask onto a wafer in an accurate and reduced fashion. The materials of such components are essentially required to be highly transmissive to light from the light source.

As LSI chips continue to become more versatile and higher performing, research and development is actively underway to increase the level of device integration on wafers. Achieving higher device integration requires a high optical resolution capable of transferring very fine patterns. The resolution is represented by equation (1).

$$R = k_1 \times \lambda / NA \qquad (1)$$

R: resolution
$k_1$: coefficient
$\lambda$: wavelength of the light source
NA: numerical aperture Equation (1) suggests that there are two ways for achieving a high resolution. One way is to increase the numerical aperture. Increasing the numerical aperture, however, entails a reduction of focal depth. The currently used numerical aperture is thus thought to be almost the limit. The other way is to shorten the wavelength of the light source. Today, the predominant ultraviolet radiation utilized as the light source has a wavelength of 248 nm (KrF excimer laser). Intensive efforts are being made to move on to shorter wavelength 193 nm (ArF excimer laser), and further reduction to wavelength 157 nm ($F_2$ excimer laser) is considered promising for the not-too-distant future.

Even for quartz glass having high UV transmittance, its transmittance gradually decreases in the vacuum ultraviolet region below 200 nm, and ceases altogether near 140 nm which is the absorption band attributable to the inherent structure of quartz glass.

Aside from quartz glass, fluoride single crystal is a candidate material for use in the vacuum ultraviolet region below 200 nm in wavelength, if transmittance is the only consideration. However, many problems including material strength, a coefficient of thermal expansion, and surface polishing necessary to use as lenses and photomask substrates must be overcome before the fluoride single crystal can be used on the practical level. Therefore, synthetic quartz glass is expected to play the very important role as the stepper component material in the future.

The transmittance by quartz glass in the range to the inherent absorption region is determined by the type and concentration of defect structures in quart glass. With respect to the $F_2$ excimer laser having a light source wavelength of 157 nm, defect structures which affect transmittance include primarily Si—Si bonds and Si—OH bonds. Si—Si bonds, sometimes referred to as "oxygen deficiency defects," have the central wavelength of absorption at 163 nm. Because these oxygen deficiency defects are also precursors of Si. defect structures (known as E' centers) which have an absorption band at 215 nm, they cause serious problems not only when $F_2$ (157 nm) is used as the light source, but also on use of KrF (248 nm) or ArF (193 nm). Si—OH bonds exhibit an absorption band near 160 nm. Therefore, the formation of defect structures must be minimized in order to produce quartz glass having a high transmittance in the vacuum UV region.

In the course of earlier research aimed at solving the above problem, quartz glass was produced by flame hydrolyzing a silica-forming reactant gas to form a porous silica matrix, then melting and vitrifying the porous silica matrix in a fluorine compound gas atmosphere. This method is successful in eliminating Si—OH bonds and instead, creating Si—F bonds in quartz glass. Si—F bonds have no absorption band above 140 nm since they have a larger band gap than Si—O bonds in quartz glass. Moreover, because Si—F bonds have a large bond energy and are very resistant to ultraviolet radiation, they do not form paramagnetic defects such as E' centers when exposed to excimer laser irradiation.

Accordingly, to obtain a quartz glass well-suited to use as an optical material for vacuum ultraviolet-related applications, it is effective to create a high concentration of Si—F bonds within quartz glass. The resulting fluorine-doped quartz glass exhibits a very high transmittance to vacuum ultraviolet radiation (157 nm) of a $F_2$ excimer laser.

Although the prior art method can create a high concentration of Si—F bonds in quartz glass, the resulting glass ingot has a substantially graded concentration between the interior and the periphery. As a consequence, there exists a transmittance distribution that the transmittance by quartz glass differs among positions at which vacuum UV radiation is irradiated. This problem was not fully overcome by the prior art method. It was thus difficult to produce quartz glass having a uniform transmittance distribution.

If quartz glass having uneven transmittance within it is used as a photomask substrate material, an image to be transferred becomes partially dim. Use of such photomask substrate is unacceptable. The uneven fluorine concentration causes not only an uneven transmittance, but also an uneven refractive index. The increased refractive index distribution within the substrate likewise inhibits an image from accurate transfer.

For the above-described reason, there is a strong desire to have a photomask-forming quartz glass substrate which is useful as an optical material for vacuum UV radiation and has a high transmittance, uniform distributions of transmittance and refractive index, and a low birefringence.

SUMMARY OF THE INVENTION

An object of the invention is to provide a process for producing synthetic quartz glass having a high transmittance and uniform distributions of transmittance and refractive index as well as the resulting synthetic quartz glass and a synthetic quartz glass substrate made thereof.

We have found that the non-uniformity of fluorine concentration which is considered to invite a distribution of transmittance is mainly governed by the density distribution of a porous silica matrix. More particularly, since the doping rate of fluorine varies with the matrix density, the concentration of fluorine atoms doped is partially graded in a matrix having a density distribution. In contrast, if a matrix having a uniform density is obtained by controlling the angle of a burner, that matrix can be vitrified into quartz glass having a uniform fluorine concentration. If quartz glass has a uniform OH group concentration of up to 10 ppm and a uniform fluorine atom concentration of up to 500 ppm, that quartz glass possesses a uniform transmittance and refractive index as well as a high transmittance to vacuum ultraviolet radiation below 200 nm. By heat treating the quartz glass synthesized by the above process, the birefringence of quartz glass can be reduced so that the synthetic quartz glass is useful as optical members complying with $F_2$ excimer lasers. The present invention is predicated on the above finding.

In one aspect, the invention provides a process for producing synthetic quartz glass, comprising the steps of feeding oxygen gas, hydrogen gas, and a silica-forming reactant gas from a burner to a reaction zone, flame hydrolyzing the silica-forming reactant gas in the reaction zone to form fine particles of silica, depositing the silica particles on a rotatable substrate in the reaction zone to form a porous silica matrix, and heating and vitrifying the porous silica matrix in a fluorine compound gas-containing atmosphere to form a fluorine-containing synthetic quartz glass. According to the invention, during formation of the porous silica matrix, the silica matrix and the flame of reactant gas from the burner are oriented to define an angle of 90 to 120° between their respective center axes so that the porous silica matrix has a density of 0.1 to 1.0 $g/cm^3$ with its distribution within 0.1 $g/cm^3$.

In one preferred embodiment, a fluorine compound gas is also fed from the burner to the reaction zone along with the silica-forming reactant gas. The process may further include the step of heat treating the synthetic quartz glass in a hydrogen gas-containing atmosphere.

In another aspect, the invention provides a synthetic quartz glass produced by the above process, which quartz glass has a hydroxyl group concentration of up to 10 ppm with its distribution within 1 ppm and a fluorine atom concentration of at least 500 ppm with its distribution within 500 ppm. Preferably, the synthetic quartz glass has a refractive index distribution of up to $5 \times 10^{-4}$ to light having a wavelength of 633 nm.

In a further aspect, the invention provides a quartz glass substrate for photomasks, made of the synthetic quartz glass defined above, which has a birefringence of up to 10 nm/cm to light having a wavelength of 633 nm.

By making use of the above process, quartz glass having high transmittance to vacuum ultraviolet radiation below 200 nm, uniform distributions of transmittance, refractive index and other parameters, and a low birefringence can be synthesized.

BRIEF DESCRIPTION OF THE DRAWINGS

The objects, features and advantages of the invention will become more apparent from the following detailed description, taken in conjunction with the accompanying drawings.

DESCRIPTION OF THE PREFERRED EMBODIMENTS

Figure 1:
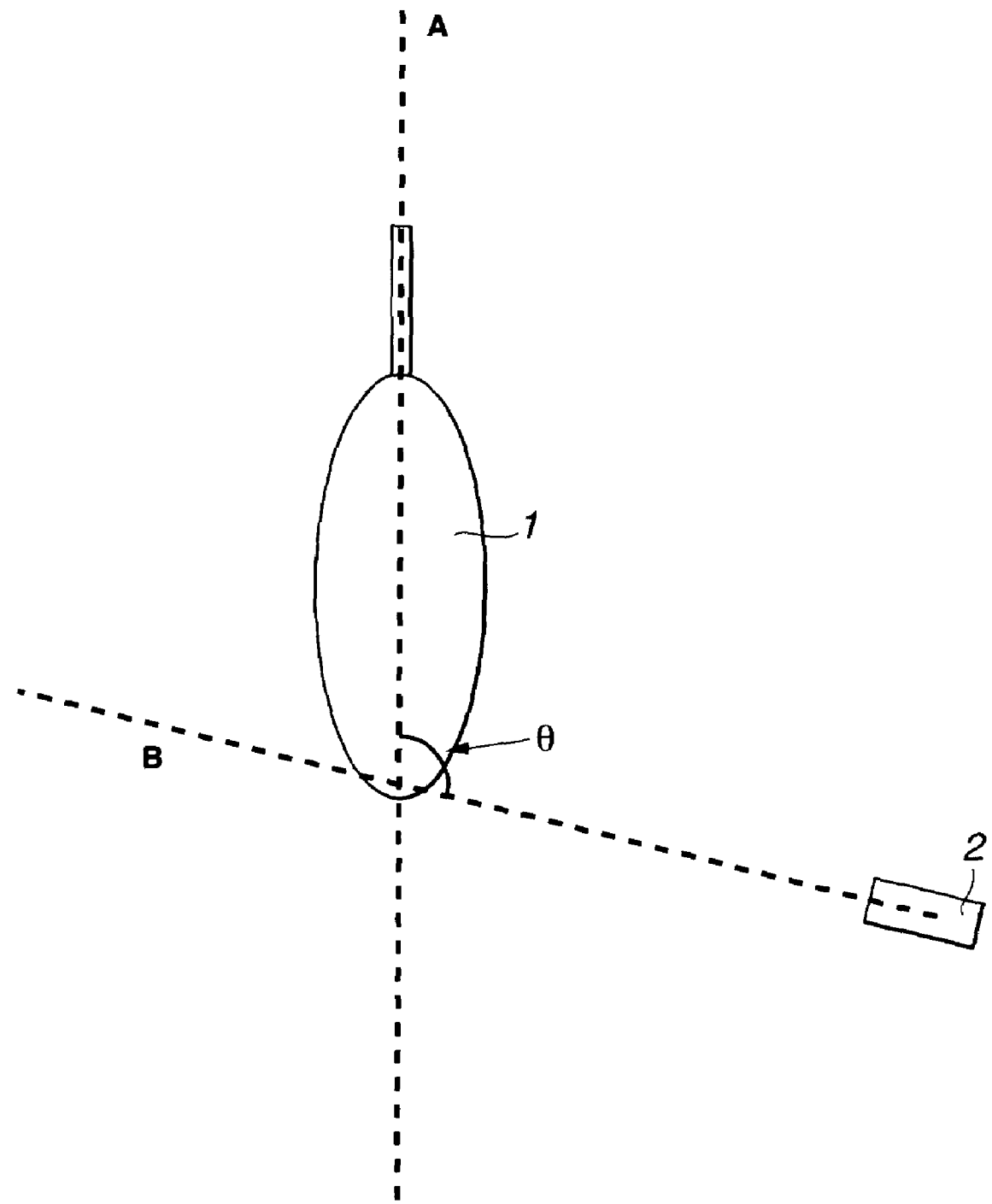
FIG. 1 illustrates the angle between the center axes of the porous silica matrix and the reactant flame ejected from the burner.

The invention pertains to fluorine-containing synthetic quartz glass useful in combination with a vacuum UV excimer laser. To increase the transmittance to vacuum UV radiation, quartz glass must be doped with fluorine atoms to create Si—F bonds in the glass structure. This is because the creation of Si—F bonds, in turn, reduces the number of Si—Si bonds and Si—OH bonds capable of absorbing vacuum UV radiation. In addition, Si—F bonds are highly resistant to UV due to their substantial bond energy.

Nevertheless, synthetic quartz glass produced by the prior art method has a transmittance distribution as previously discussed. We first made a study on the non-uniformity of fluorine atom concentration which was considered to develop such a transmittance distribution.

With respect to the doping of quartz glass with fluorine, a molecular diffusion consideration suggests that quartz glass having a lower density is more readily doped. Since the prior art method carries out fluorine doping along with vitrification that progresses inward from the surface of the matrix, the bulk density at the surface increases during the doping so that the doping rate gradually lowers, resulting in a low dopant concentration at the middle of the matrix. To help the dopant reach the middle of the matrix, the prior art employed several countermeasures, such as reducing the density of the entire matrix, increasing the fluorine concentration during vitrification or prolonging the doping time.

However, the low density matrix leads to a small production yield per lot. The increased fluorine concentration and the prolonged doping time increase the amount of expensive fluorine compound gas, undesirably increasing the cost. Still worse, these countermeasures do not always accomplish a uniform transmittance distribution.

We have found that a fluorine concentration distribution in quartz glass is primarily caused by a density distribution of a porous silica matrix prior to vitrification. The radial distribution of density in a porous silica matrix produced under prior art conditions was examined to find that in one example, the density changed in the order of low→high→low from the periphery to the middle. Then, the rate of fluorine doping changed radially along with the matrix density, resulting in a graded fluorine concentration upon vitrification. If a substantial density difference existed within the matrix, the dopant could not reach the middle of the matrix and sometimes, the matrix was partially left unvitrified.

To overcome the above-discussed problem, we have conceived that uniform fluorine doping becomes possible if a porous silica matrix having a uniform density is vitrified.

According to the invention, a porous silica matrix is produced by feeding oxygen gas, hydrogen gas, a silica-forming reactant gas, and optionally, a fluorine compound gas from a burner to a reaction zone, flame hydrolyzing the silica-forming reactant gas in the reaction zone to form fine particles of silica, and depositing the silica particles on a rotatable substrate in the reaction zone.

The above process is per se known. The invention is characterized in that in the process of forming the porous silica matrix, as shown in FIG. 1, the silica matrix 1 having a center axis A and the flame of reactant gas ejected from the burner 2 having a center axis B in an ejection direction are oriented such that the center axis A of the silica matrix 1 defines an angle θ of 90° to 120° with the center axis B of the reactant flame.

This orientation ensures that the reactant flame, which is concentrated at a local area of the matrix in the prior art, is applied to a wider surface area of the matrix so that the resulting porous silica matrix may have a uniform density. The porous silica matrix should have a density of 0.1 to 1.0 g/cm$^3$ with its distribution within 0.1 g/cm$^3$ for ease of fluorine doping during vitrification. Preferably the porous silica matrix should have a density of 0.2 to 0.5 g/cm$^3$ with its distribution within 0.05 g/cm$^3$. The porous silica matrix having such a uniform density distribution is heated and vitrified in a fluorine compound gas atmosphere whereby the resulting quartz glass has a uniform concentration of fluorine atoms within it and hence, uniform distributions of transmittance and refractive index. In the above process of producing a porous silica matrix, it is acceptable to feed a fluorine compound gas from the burner to the reaction zone along with the silica-forming reactant gas to form a fluorine-containing porous silica matrix. Then uniform fluorine doping is carried out during the formation of the matrix as well.

The silica-forming reactant used herein may be selected from well-known silicon compounds including chlorosilanes such as silicon tetrachloride and alkoxysilanes such as tetramethoxysilane although the alkoxysilanes free of chlorine are preferred because Si—Cl bonds absorb ultraviolet radiation. The fluorine compound may be selected from $SiF_4$, $CHF_3$, and $CF_4$, to name a few.

Vitrification may be carried out using a known method and conditions, such as heating and vitrifying in a furnace having a fluorine compound gas atmosphere or a mixed gas atmosphere composed of a fluorine compound gas and an inert gas such as helium or argon. The concentration of the fluorine compound should preferably be 1% by volume or higher. The vitrifying temperature is preferably at least 1,200° C. and more preferably in the range of 1,300° C. to 1,500° C. Following vitrification, the quartz glass is cooled to room temperature within the same furnace by quenching, controlled slow cooling or allowing to cool.

After vitrification, the resulting quartz glass is generally heat treated or annealed in air or an inert gas atmosphere. The annealing is effective for mitigating thermal strains, improving the uniformity of refractive index distribution and reducing the birefringence. Annealing is carried out by heating quartz glass above its annealing point and slowly cooling below its strain point. Since the annealing point and strain point depend on the fluorine atom concentration and other factors of quartz glass, the annealing temperature may be set as appropriate in accordance with the fluorine atom concentration and other factors. The slow cooling rate to the strain point is preferably 15° C./hr or less, more preferably 10° C./hr or less, and most preferably 5° C./hr or less.

Advantageously, the resulting synthetic quartz glass is further heat treated in a hydrogen gas-containing atmosphere. This heat treatment is to introduce hydrogen atoms to compensate for structural defects such as E' centers that will form when the quartz glass is exposed to excimer laser irradiation.

While the number of such paramagnetic defect precursors (e.g., Si—Si bonds) has been considerably reduced in the vitrifying method according to the invention, the hydrogen heat treatment further strengthens the UV light resistance of the quartz glass.

A known method and known conditions may be used to carry out hydrogen heat treatment. For example, it is advantageous to mix hydrogen gas with an inert gas such as helium or argon, and hold the system at a pressure of 1 to 10 MPa and a temperature of 300 to 600° C. to dope the fluorine-containing quartz glass with hydrogen. The preferred hydrogen concentration is 1 to 3% by volume.

Vitrification of the porous silica matrix in a fluorine compound gas atmosphere and subsequent annealing and hydrogen doping may be carried out as consecutive steps.

The synthetic quartz glass produced by the above-described sequence of steps according to the invention and quartz glass substrate should preferably have a low and uniform hydroxyl group concentration. Specifically, to minimize the influence by absorption of Si—OH bonds, the hydroxyl group concentration is preferably up to 10 ppm, more preferably up to 1 ppm, and most preferably up to 0.1 ppm. Also the synthetic quartz glass should preferably have a fluorine atom concentration of at least 500 ppm with a distribution within 500 ppm, more preferably at least 1,000 ppm with a distribution within 500 ppm, and most preferably at least 1,000 ppm with a distribution within 300 ppm.

The distribution of fluorine concentration can be adjusted with difficulty by controlling temperature and other conditions during vitrification according to the prior art teaching. In contrast, the controlled distribution is achieved by starting with a porous silica matrix having a uniform density according to the invention.

The quartz glass should preferably have a refractive index distribution of up to $5 \times 10^{-4}$, and more preferably up to $1 \times 10^{-4}$, to light having a wavelength of 633 nm, for example. It is preferred that such a refractive index distribution be reached at the end of vitrification although it is acceptable that the distribution is reached at the end of annealing. The birefringence at the end of annealing is preferably up to 10 nm/cm, and more preferably up to 5 nm/cm, to light having a wavelength of 633 nm, for example.

The quartz glass at the end of hydrogen doping has a hydrogen atom concentration of preferably at least $1 \times 10^{17}$ molecules/cm$^3$, more preferably at least $3 \times 10^{17}$ molecules/cm$^3$, and most preferably at least $1 \times 10^{18}$ molecules/cm$^3$.

EXAMPLE

Examples of the invention and comparative examples are given below by way of illustration, and not by way of limitation. The vitrifying temperature and other conditions used in the examples are not intended to restrict the scope of the invention.

Example 1

A porous silica matrix was produced in cylindrical form by feeding from a burner 3.5 m$^3$/h of hydrogen gas, 5.0 m$^3$/h of oxygen gas, and 1,000 g/h of tetramethoxysilane gas as the silica-forming reactant, and carrying out hydrolysis in an oxyhydrogen flame. The angle θ between the center axis of the matrix and the center axis of the reactant flame ejected from the burner was adjusted to 110°. The density of the porous silica matrix was measured in both radial and longitudinal directions to find a distribution in the range of 0.30 to 0.40 g/cm$^3$.

A porous silica matrix was produced again under the same conditions as above. It was heated at 1,400° C. in a $SiF_4$ atmosphere within a high-temperature glassmaking furnace to effect melting and vitrification, thereby forming a synthetic quartz glass. A mixture of He and $SiF_4$ gas in a ratio of 9:1 was introduced into the furnace at a flow rate of 0.1 $m^3/h$. Vitrification took 15 hours.

After the synthetic quartz glass produced as above was shaped, it was annealed in a high-temperature air furnace by heating to 1,350° C. and then slowly cooling at a rate of 10° C./hr from 1,350° C. to 800° C.

The quartz glass was cut into a substrate of 6 inches square and ¼ inch thick, which was measured for physical properties. Transmittance was measured by a vacuum UV spectrophotometer; an OH group concentration by Fourier transform infrared spectroscopy (FT-IR); a refractive index distribution by the oil-on plate method using light of 633 nm wavelength; a birefringence by optical heterodyne interferometry; a fluorine concentration by electron probe microanalysis (EPMA); a hydrogen molecule concentration by Raman spectroscopy.

The results are shown in Table 1. The fluorine atom concentration had a distribution within 500 ppm, and the transmittance was high and uniform.

Example 2

A fluorine-doped porous silica matrix was produced in cylindrical form by feeding from a burner 3.5 $m^3/h$ of hydrogen gas, 5.0 $m^3/h$ of oxygen gas, 1,000 g/h of tetramethoxysilane gas as the silica-forming reactant and 0.03 $m^3/h$ of $SiF_4$ gas, and carrying out hydrolysis in an oxyhydrogen flame. The angle θ between the center axis of the matrix and the center axis of the reactant flame ejected from the burner was adjusted to 100°. The density of the porous silica matrix was measured in both radial and longitudinal directions to find a distribution in the range of 0.30 to 0.35 $g/cm^3$.

A fluorine-doped porous silica matrix was produced again under the same conditions as above. It was heated at 1,400° C. in a $SiF_4$ atmosphere within a high-temperature glassmaking furnace to effect melting and vitrification, thereby forming a synthetic quartz glass. A mixture of He and $SiF_4$ gas in a ratio of 2:1 was introduced into the furnace at a flow rate of 0.1 $m^3/h$. Vitrification took 15 hours.

After the synthetic quartz glass produced as above was shaped, it was annealed in a high-temperature air furnace by heating to 1,300° C. and then slowly cooling at a rate of 5° C./hr from 1,300° C. to 800° C. The quartz glass was then heat treated at 450° C. for 100 hours in an atmosphere of hydrogen and helium. During heat treatment, the $H_2$ concentration was 3% by volume, and the pressure was 10 MPa.

After the hydrogen doping, the quartz glass was cut into a substrate of 6 inches square and ¼ inch thick, which was measured for physical properties.

Figure 2:
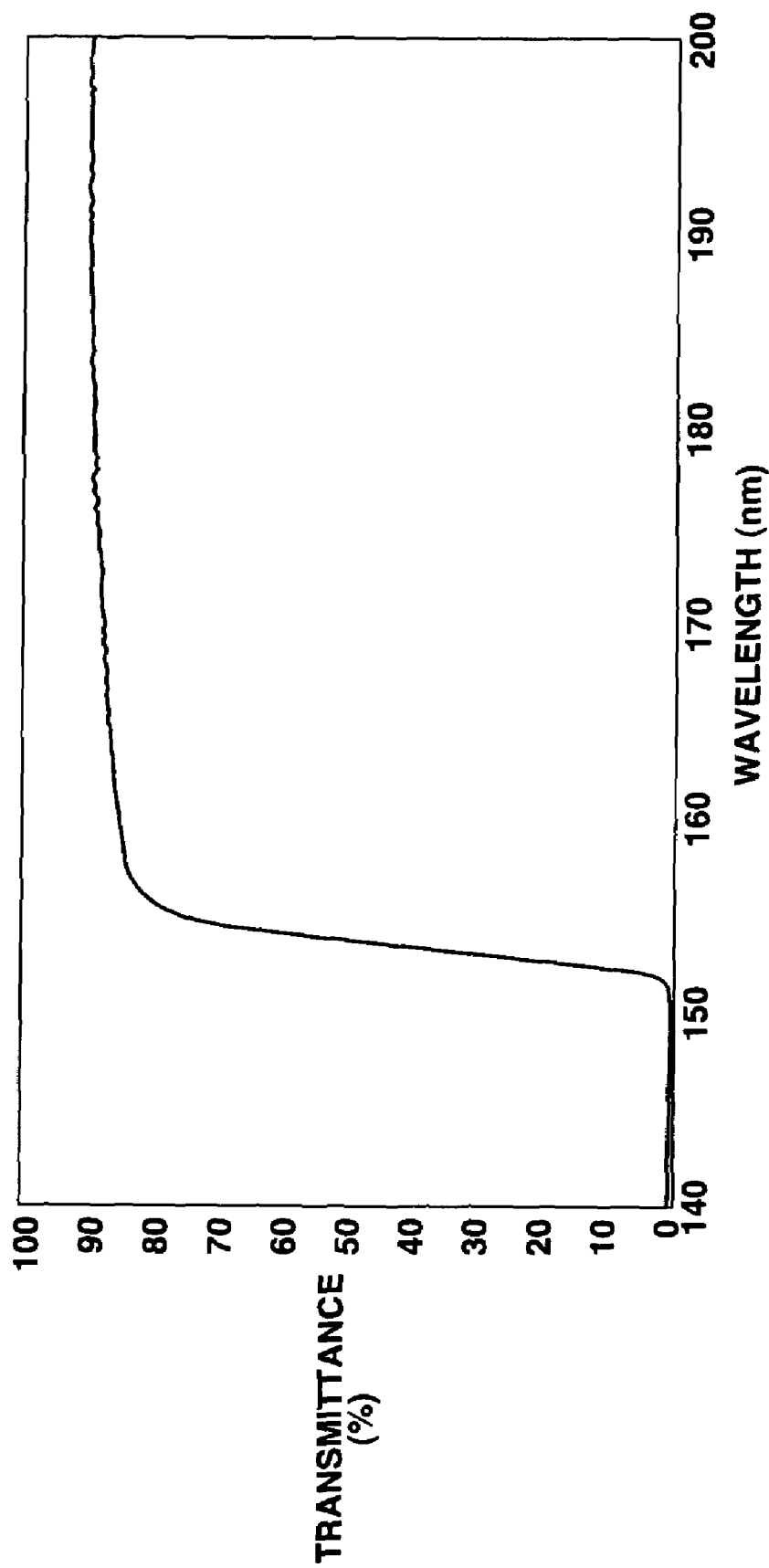
FIG. 2 is a plot of the vacuum ultraviolet light transmittance by a quartz glass substrate (at its middle) produced in Example 2.

The results are shown in Table 1. The fluorine atom concentration had a distribution within 300 ppm, and the transmittance was high and uniform. The refractive index distribution and birefringence were satisfactory. FIG. 2 is a curve of transmittance in the middle of the substrate versus wavelength.

Comparative Example 1

A porous silica matrix was produced in cylindrical form by feeding the gases under the same conditions as in Example 1, and carrying out hydrolysis in an oxyhydrogen flame. The angle θ between the center axis of the matrix and the center axis of the reactant flame ejected from the burner was adjusted to 130°. The density of the porous silica matrix was measured in both radial and longitudinal directions to find a distribution in the range of 0.20 to 0.40 $g/cm^3$.

A porous silica matrix was produced again under the same conditions as above. It was heated at 1,400° C. in a $SiF_4$ atmosphere within a high-temperature glassmaking furnace to effect melting and vitrification, thereby forming a synthetic quartz glass. A mixture of He and $SiF_4$ gas in a ratio of 2:1 was introduced into the furnace at a flow rate of 0.1 $m^3/h$. Vitrification took 15 hours.

After the synthetic quartz glass produced as above was shaped, it was annealed in a high-temperature air furnace by heating to 1,300° C. and then slowly cooling at a rate of 5° C./hr from 1,300° C. to 800° C.

The quartz glass was cut into a substrate of 6 inches square and ¼ inch thick, which was measured for physical properties.

The results are shown in Table 1. The fluorine atom concentration had a substantial distribution, and the transmittance and refractive index distributions were very wide as well.

| | Example 1 | Example 2 | Comparative Example 1 |
|---|---|---|---|
| Transmittance (%) at 157.6 nm | 83.2–84.0 | 84.0–84.5 | 75.0–80.5 |
| OH group concentration (ppm) | <0.1 | <0.1 | <1.0 |
| Refractive index distribution | $5 \times 10^{-4}$ | $2 \times 10^{-4}$ | $1 \times 10^{-3}$ |
| Birefringence (nm/cm) | <10 | <5 | <50 |
| Fluorine concentration (ppm) | 8500–9000 | 11070–11300 | 8200–11000 |
| Hydrogen concentration (molecules/$cm^3$) | — | $>1 \times 10^{18}$ | — |

*Note that the refractive index distribution and birefringence were measured at wavelength 633 nm.

There has been described a process involving carrying out hydrolysis of silica-forming reactant in an oxyhydrogen flame with the controlled burner angle setting to form a porous silica matrix having a uniform density and vitrifying the silica matrix in a fluorine compound gas atmosphere. Synthetic quartz glass is produced having high transmittance to vacuum UV radiation below 200 nm and uniform distributions of transmittance and refractive index.

Japanese Patent Application No. 2000-248556 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A process for producing synthetic quartz glass, comprising: feeding oxygen gas, hydrogen gas, and a silica-forming reactant gas from a single burner to a reaction zone, flame hydrolyzing the silica-forming reactant gas in the reaction zone to form fine particles of silica, depositing the silica particles on a rotatable substrate in the reaction zone to form a cylindrical porous silica matrix wherein during formation of the porous silica matrix, the silica matrix and the flame of reactant gas from the single burner are oriented to define an angle of 100°–110° between their respective center axes so that the entire cylindrical porous silica matrix has a density of 0.1–1.0 $g/cm^3$ with a uniform density defined by a density distribution within 0.1 $g/cm^3$, and heating and vitrifying the porous silica matrix in a fluorine compound gas-containing atmosphere to form a fluorine-containing synthetic quartz glass.

2. The process of claim 1 wherein a fluorine compound gas is also fed from the burner to the reaction zone along with the silica-forming reactant gas.

3. The process of claim 1, further comprising heat treating the fluorine-containing synthetic quartz glass in a hydrogen gas-containing atmosphere.

4. A process according to claim 1, wherein the silica-forming reactant gas is silicon tetrachloride or an alkoxysilane.

5. A process according to claim 4, wherein the alkoxysilane is tetramethoxysilane.

6. A process according to claim 2, wherein the fluorine compound is $SiF_4$, $CHF_3$, or $CF_4$.

7. A process according to claim 1, wherein the fluorine compound gas containing atmosphere comprises a fluorine compound gas and an inert gas.

8. A process according to claim 7, wherein the inert gas is helium or argon.

9. A process according to claim 3, wherein the hydrogen gas-containing atmosphere comprises helium or argon.

10. A process according to claim 3, wherein the hydrogen gas-containing atmosphere comprises 1–3% by volume hydrogen.

11. A process according to claim 1, wherein the flame of reactant gas is directed at the tip of the forming cylindrical porous silica matrix.

* * * * *